Dec. 15, 1925.                                                                1,566,098
W. H. JOHNSON
OIL SALVAGE DEVICE
Filed Sept. 5, 1924

Inventor,
W. H. Johnson, by
G. C. Kennedy
Attorney.

Patented Dec. 15, 1925.

1,566,098

UNITED STATES PATENT OFFICE.

WILLIS H. JOHNSON, OF WATERLOO, IOWA, ASSIGNOR TO HAWKEYE-DART TRUCK COMPANY, OF WATERLOO, IOWA.

OIL-SALVAGE DEVICE.

Application filed September 5, 1924. Serial No. 736,141.

*To all whom it may concern:*

Be it known that I, WILLIS H. JOHNSON, citizen of the United States, residing at Waterloo, in the county of Black Hawk and State of Iowa, have invented certain new and useful Improvements in Oil-Salvage Devices, of which the following is a specification.

My invention relates to improvements in oil-salvaging devices, and the object of my improvement is to supply means for retaining then delivering to a receptacle oil which may pervasively traverse crevices of a bearing in an installation where the bearing for a shaft is positioned in the wall of an oil-pump or other container.

This object I have accomplished by the means which are hereinafter described and claimed, and which are illustrated in the accompanying drawing, it being understood that the invention may be evidenced by equivalent devices other than that shown, and yet within the protection of the claim.

Figure 1:
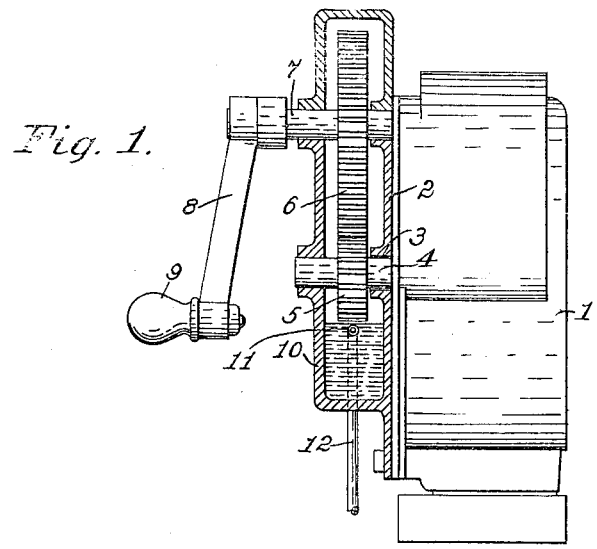

In the annexed drawings, Fig. 1 is a side elevation, in part a vertical section, of the combination with a rotary oil-pump of my improved oil-salvaging means.

Figure 2:
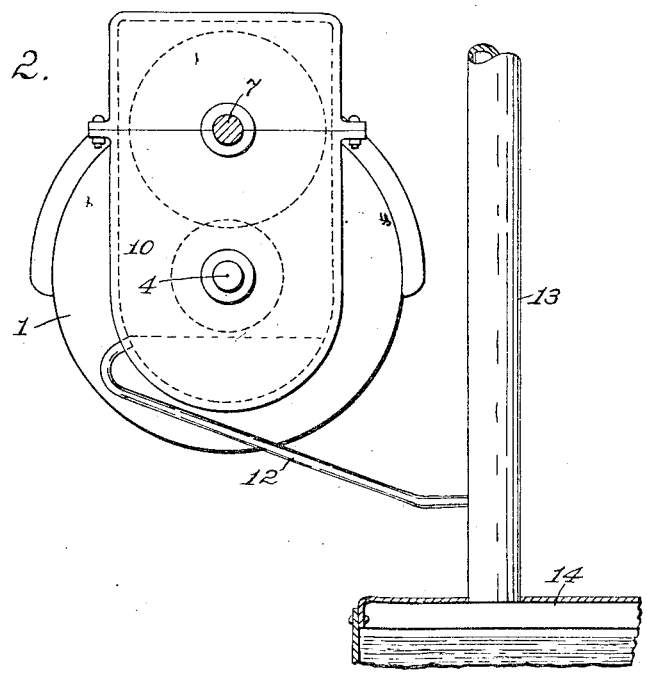

Fig. 2 is a front elevation of the same, with the crank-handle removed, and a main oil conduit and reservoir added.

In pumps for lifting oils, such as gasoline, into a measuring-tank, or in cases where an oil container has in a wall an apertured bearing seating a rotatable shaft, at times oil escapes in small quantities through the bearing between the shaft and the abutting surfaces even when the interspace is exceedingly small. This is true especially of gasoline or the other light products of petroleum. Such oil, having escaped drop by drop, in part vaporizes or flows downwardly upon the exterior surface of the container and upon a floor or a more or less absorbent substructure where it may become accidentally ignited by a dropped match or burning cigar stub. Gasoline may thus easily pervasively permeate the interspaces of the bearing to exude without, while in time considerable loss of oil occurs.

The numeral 1 denotes the substantially cylindrical hollow housing of a rotary oil-pump containing the usual piston members mounted upon a shaft 4 seated in an apertured bearing 3. This bearing is simple and has no stuffing-box, but even in the event that a stuffing-box is used, the volatile light oil may escape therethrough as is evident.

The numerals 2—10 denote the upper and lower parts of a receptacle for such exuding oil passing the bearing 3 and into which it extends. As shown, the projecting part of the shaft 4 carries a pinion 5 in mesh with a gear-wheel 6, and the latter is mounted on a short shaft 7 in alined bearings in the upper part of the receptacle. On the outer end of the shaft 7 is a crank 8 with a handle 9.

The lower part 10 of the receptacle is commodious enough to contain the drippings from the bearing 3, and a small port 11 is provided in the wall of the receptacle at the upper level of the oil therein but below said bearing through which the oil drains to a pipe 12, the latter delivering into a main conduit 13 whose lower end enters a main oil tank 14.

It will be seen that the covered receptacle retains the volatile oil, and that it is saved without any danger of escape to the atmosphere or exposure to fire hazard.

Having described my invention, what I claim as new, and desire to secure by Letters Patent, is:

The combination with a liquid container having a side wall bearing and a rotatable shaft projecting through said bearing, of an outer wall cup integral with the side wall and inclosing said bearing to a level thereabove, and a removable closure cap for said cup, and a conduit communicating with the cup below the level of the bearing to drain the contents of the cup at that level.

In testimony whereof I affix my signature Aug. 12, 1924.

WILLIS H. JOHNSON.